United States Patent [19]

Conolly

[11] Patent Number: 4,623,087

[45] Date of Patent: Nov. 18, 1986

[54] APPLICATION OF COATINGS TO ARTICLES

[75] Inventor: Ralph I. Conolly, Bristol, England

[73] Assignee: Rolls-Royce Limited, England

[21] Appl. No.: 614,244

[22] Filed: May 25, 1984

[30] Foreign Application Priority Data

May 26, 1983 [GB] United Kingdom ................ 8314669
Jul. 15, 1983 [GB] United Kingdom ................ 8319182

[51] Int. Cl.$^4$ ............................................ B23P 15/04
[52] U.S. Cl. ................................ 228/176; 29/156.8 B;
29/156.8 H; 29/421 R; 29/423; 29/527.2;
228/159
[58] Field of Search .................... 29/156.8 B, 156.8 H,
29/156.8 R, 423, 424, 527.6, 527.2, 421 R;
228/176, 243, 173.2, 159, 160, 49; 156/232, 239;
419/8, 36

[56] References Cited

U.S. PATENT DOCUMENTS

| 2,289,311 | 7/1942 | Wellman | 29/423 X |
|---|---|---|---|
| 2,641,439 | 6/1953 | Williams | 29/156.8 H X |
| 2,946,681 | 7/1960 | Probst et al. | 29/156.8 H X |
| 3,248,788 | 5/1966 | Goldstein et al. | 29/424 X |
| 3,364,089 | 1/1968 | Koubek | 156/232 |
| 3,547,720 | 12/1970 | Jones | 156/232 X |
| 3,568,301 | 3/1971 | Shibata . | |
| 3,884,771 | 5/1975 | Hanabusa et al. | 156/581 X |
| 3,975,165 | 8/1976 | Elbert et al. | 427/190 X |
| 4,156,306 | 5/1979 | Seidel et al. | 29/423 |
| 4,183,456 | 1/1980 | Schilling . | |
| 4,218,007 | 8/1980 | Schilling . | |
| 4,318,965 | 3/1982 | Blair . | |
| 4,370,789 | 2/1983 | Schilke et al. | 29/156.8 H |
| 4,398,952 | 8/1983 | Drake | 428/547 X |
| 4,447,466 | 5/1984 | Jackson et al. | 29/156.8 B X |

FOREIGN PATENT DOCUMENTS

| 0009885 | 4/1980 | European Pat. Off. . |
| 2359172 | 6/1975 | Fed. Rep. of Germany . |
| 2604475 | 9/1976 | Fed. Rep. of Germany . |
| 2081121 | 3/1976 | France . |
| 739565 | 11/1955 | United Kingdom . |
| 800414 | 8/1958 | United Kingdom . |
| 1097300 | 1/1968 | United Kingdom . |
| 1175816 | 12/1969 | United Kingdom . |
| 1255360 | 12/1971 | United Kingdom . |
| 1307338 | 2/1973 | United Kingdom . |
| 1334683 | 10/1973 | United Kingdom . |
| 1339652 | 12/1973 | United Kingdom . |
| 1402391 | 8/1975 | United Kingdom . |
| 1413886 | 11/1975 | United Kingdom . |
| 1426882 | 3/1976 | United Kingdom . |
| 1440449 | 6/1976 | United Kingdom . |
| 1440650 | 6/1976 | United Kingdom . |
| 1475051 | 6/1977 | United Kingdom . |
| 1482692 | 8/1977 | United Kingdom . |
| 1545962 | 10/1979 | United Kingdom . |
| 1554195 | 10/1979 | United Kingdom . |
| 2024256 | 1/1980 | United Kingdom . |
| 2042393 | 9/1980 | United Kingdom . |
| 2063747 | 6/1981 | United Kingdom . |
| 2066113 | 7/1981 | United Kingdom . |
| 2098240 | 11/1982 | United Kingdom . |
| 2112081 | 7/1983 | United Kingdom . |
| 2111604 | 7/1983 | United Kingdom . |

Primary Examiner—Kenneth J. Ramsey
Attorney, Agent, or Firm—Parkhurst & Oliff

[57] ABSTRACT

It is known to apply coatings which have desired characteristics, e.g., wear resistance, thermal barrier capabilities anti-oxidation, to articles the material of which does not have the desired characteristic, wherein the coating is applied directly to the article. Some article materials, e.g. titanium are highly reactive which immediately obviates several known methods of applying coatings. The invention uses a member (12) which would normally be preformed to mate with the article surface to be coated. The member (12) is manufactured from cheap, non-reactive material, as a base to which the coating (14) is applied by the most suitable of any of the known means. The member (12) is then placed against the article with the coating (14) therebetween and the whole hot isostatically pressed. The member (12) is afterwards removed, e.g. by machining or etching.

13 Claims, 15 Drawing Figures

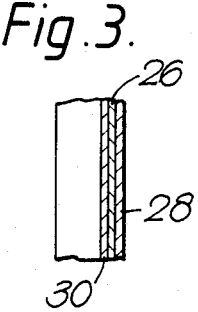
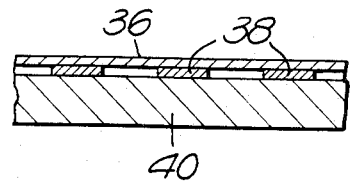
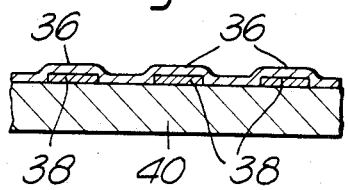
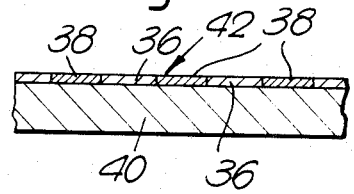
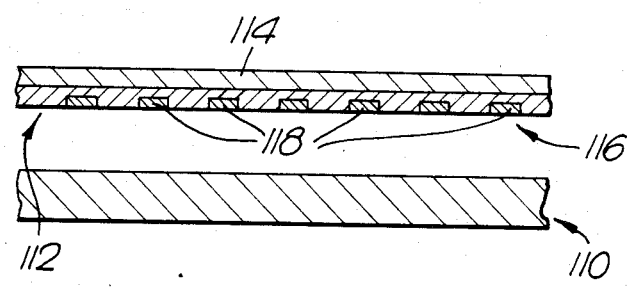
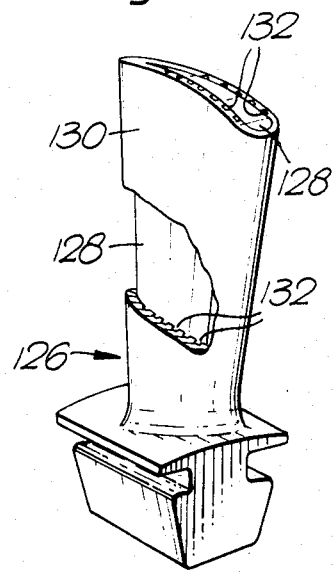
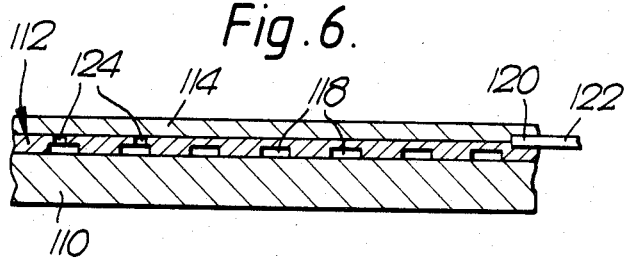

APPLICATION OF COATINGS TO ARTICLES

This invention relates to a method of applying coatings to articles.

The invention has particular efficacy in the application of a coating to articles of non-planar form, the coating of bore surfaces, and reactive materials.

Known methods of applying coatings, particularly metallic and ceramic coatings, include spraying using various forms of energy, e.g., plasma and laser, with which to melt the particles being sprayed on to the article, vapour deposition, pack processes and electro desposition.

Some of such methods are wasteful of material and none guarantee an homogenous end product. Further, maintenance of coating thickness over a given surface area is all but impossible. Moreover, where the article is made from a reactive material such as titanium, some coating methods are excluded.

It is also known to apply a formed coating sheet to an article, and hot isostatically press it into place (see GB-A-2063747), but in practice it is difficult to conform the sheet to the article unless the article is of a very simple shape. Other methods of directly applying a coating using hot isostatic pressing are shown in GB-A-2024256 and GB-A-2066113.

According to the present invention there is provided a method of applying a coating to a surface area of a substantially rigid component, to form a composite article having a pre-determined shape, comprising the steps of:

(a) forming a carrier member a part of which has a surface area shaped in a pre-determined configuration, (b) applying a coating on said surface area of the carrier member, the combination of the carrier member and coating being substantially rigid and the coating having a surface area on the opposite side thereof from the carrier member which is shaped in reverse conformity to said surface area of the rigid component, (c) assembling together the component and the carrier member, with the conforming surfaces of the component and the coating adjacent each other, and (d) hot isostatically pressing the assembled component and member with sufficient heat and pressure to bond together the adjacent conforming surfaces of the component and the coating to form a composite article.

At least two coatings may be applied to the carrier member in reverse order relative to their desired order on the article.

The method may include applying the coating to the carrier member in the form of spaced portions and hot isostatically pressing the member into the spaces, onto the article and thereafter removing those portions of the member covering the coating.

A stop off material may be applied between the member and the coating.

The invention will now be described, by way of example and with reference to the accompanying drawings in which:

FIG. 3 depicts a still further embodiment,

FIGS. 4a to 4c depict steps in a further embodiment of the invention,

FIGS. 5 and 6 show steps in a further method for forming an article with cooling channels, and FIG. 7 shows a turbine blade with such cooling channels.

Figure 1:
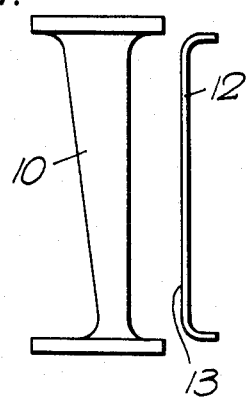
FIGS. 1 to 1c depict steps in one embodiment of the invention.
Figure 1A:
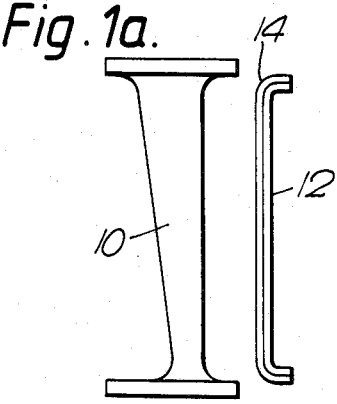
Figure 1B:
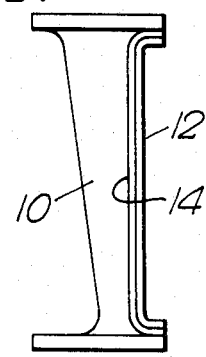
Figure 1C:
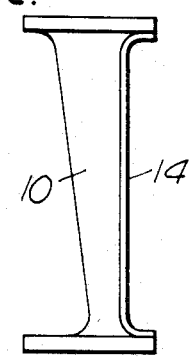

Referring to FIGS. 1 to 1c. An article 10 which, merely by way of example, may be a turbine blade, is to have a coating applied thereto. The coating would normally be metallic and for example could comprise any of the following: Hard surfacing alloys, thermal barrier materials, materials having desired electrical characteristics, and materials having resistance to chemical environments.

A carrier member 12 which can be made in steel iron or other cheap material, is formed so that it includes a shape 13 which corresponds with the shape of that surface of article 10 which is to be coated.

Referring now to FIG. 1a, the desired coating 14 is applied to the shaped surface 13 of member 12. Application can be achieved by any suitable known means, such as plasma spraying, pack deposition, electro deposition or by first applying a tacky adhesive to the surface 13 and then sprinkling the coating in a dry powder form onto the tacky surface. This latter method is fully described and claimed in British Patent specification No. 1,334,683.

Member 12 is placed against article 10 with the coating 14 therebetween, as shown in FIG. 1b. The assembly is placed in a metal bag (not shown) which is then evacuated and as a result, collapses onto the assembly and clamps it together. The bag (not shown) is placed in a furnace (not shown) which is then pressurized and heated so as to achieve hot isostatic pressing of the assembly into an homogenous structure.

On completion of the process, the bag is removed from around the assembly, along with the member 12, by any suitable means, thus leaving article 10 with a homogenous coating 14 as depicted in FIG. 1c.

Should it be required that article 10 be completely coated, two members 12 are formed, a coating applied to each and then members 12 are placed against respective sides of article 10 and welded around their edges so that they form the bag. A small aperture is left to enable evacuation of the interior of the container and thereafter, the hot isostatic pressing process is carried out as described hereinbefore.

Alternatively the welding process can be carried out in vacuum, for example using an electron beam process, thus obviating the need for a separate evacuation procedure.

Figure 2:
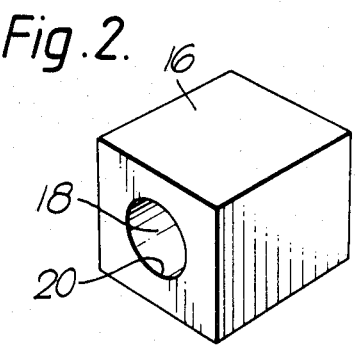
FIGS. 2 to 2c depict a second embodiment of the invention.
Figure 2B:
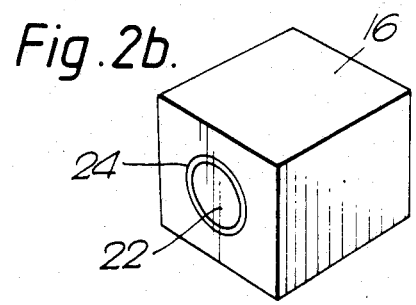
Figure 2A:
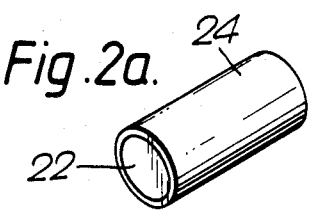
Figure 2C:
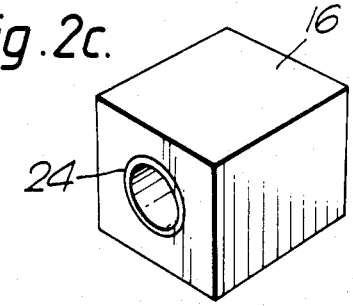

In FIG. 2 an article 16 has a bore 18, on the surface 20 of which, it is desired to apply a coating. A carrier mandrel 22 (FIG. 2a) of appropriate diameter is provided and the desired coating 24 applied thereto by any suitable method. The thickness of coating 24 is such as to achieve a push fit between the coated mandrel 22 and bore 18 (FIG. 2b). The assembly is then placed in a metallic bag (not shown) which is then evacuated, placed in a furnace and the whole assembly is hot isostatically pressed. Afterwards, the bag (not shown) is removed by machining or other suitable means, as is the mandrel 22 leaving article 16 with its bore surface 20 coated (FIG. 2b).

Referring now to FIG. 3. Where the member 28 is a single sheet, its removal after hot isostatic pressing may be facilitated by the insertion of a stop off material 26, e.g., Yttria in powder form, between the member 28 and the coating 30. As is known, the stop off material 26 will prevent diffusion bonding occurring between the member 28 and coating 30, which will result in a relatively weak key between them.

Referring now to FIG. 4. A coating is required to be applied to an article 40 in the form of alternate strips 36 and 38 of different materials.

This is achieved by making a carrier member from one of the desired materials, say material 36, the member being in sheet form as illustrated in FIG. 4a. Strips of the alternating material 38 are laid on member 36 and the sub assembly then placed against the article 40 with the strips 38 therebetween. All the steps to achieve hot isostatic pressing are carried out as described hereinbefore and afterwards, those portions of member 36 which stand proud of strips 38 as seen in FIG. 4b, are machined off, to leave the smooth surface 42 depicted in FIG. 4c.

An important advantage which is derived from the application of a coating to a member prior to transferring it to an article, is that the member can be manufactured from virtually any cheap, relatively non-reactive metal. It follows that any method of applying the coating to the member may be employed, including those methods which the material of the article to which the coating will be transferred may find hostile, e.g., immersion in chemical plating solutions.

A further advantage which accrues is that straight bores, at least, no longer need spraying, which operation has always been difficult, particularly with respect to achievement of an even thickness by virtue of the enclosed nature of the surface to be coated.

A multiplicity of coatings may be applied to a single article by the method of the invention either via a corresponding number of carrier members, or by being laminated in the appropriate reverse order on a single carrier member.

Referring to FIG. 5, the wall 110 of a combustion chamber for a gas turbine engine (not shown) is to be externally clad with a skin in the form of a sheet member 112. Wall 110 is shown in flat form, i.e., prior to bending into a barrel-like shape.

In the present example sheet member 112 has been formed on a backing sheet 114 by the deposition thereon of particles of a heat resistant material to form a composite. The deposition of the particles is achieved by plasma spraying the particles on to the backing sheet 114. Provided, however, that the characteristics of the materials of the sheet 112 and backing sheet 114 are suitable, the deposition of one into the other may be achieved by, e.g., electro chemical deposition, rolling or by any other known method.

After application of the sheet 112 to the backing sheet 114, grooves 116 are formed in the exposed face of the sheet 112 by conventional cutting or chemi-etching. Grooves 116 are then filled with a leachable material 118 which, e.g., may be a ceramic, steel or iron.

The composite of sheet 112 and backing sheet 114 is placed against combustion chamber wall 110 with the exposed surface of sheet 112 abutting a surface of the combustion chamber wall 110, and the whole assembly is enveloped in a metallic bag (not shown) which is then evacuated and in turn placed in a furnace (not shown). The furnace is purged, filled with an inert gas and heated, the temperature and pressure attained being sufficient to bring about hot isostatic pressing and thus joining of the wall 110 and sheet 112 into a homogenous article.

Referring now to FIG. 6. On cooling of the article, backing member 114 is removed by any suitable means, e.g., if a stop off material is sandwiched between the backing member 114 and sheet 112 prior to the hot isostatic pressing operation, a homogenous bond between them will be prevented. Holes 120 may be drilled in the joint line and gas delivery tubes 122 inserted.

A gas such as Argon is then pumped through the tubes and penetrates the joint line, so urging sheet 122 and backing member 114 apart.

The filled 118 is then leached out and the wall 110 rolled and butt welded to form a cylinder which includes clear passageways. Radial holes 124 may be drilled into the passages to enable transpiration cooling to be achieved during operation of the combustion chamber in a gas turbine engine (not shown).

Referring now to FIG. 7. A turbine blade 126 has an aerofoil portion 128 clad in a skin 130, which has been applied to the aerofoil 128 in the manner described hereinbefore with reference to FIGS. 5 and 6.

Prior to its application to the aerofoil 128, skin 130 had grooves 132 formed and filled with a leachable material (not shown) as desribed hereinbefore and after the application of skin 130, the leachable material was leached out leaving an aerofoil 128 with no discontinuities in its surface, covered by a skin 130 which, with the aerofoil 128, forms clear passageways for the transport of cooling fluid during operation of turbine blade 126 in a gas turbine engine (not shown).

In either of the two examples just described the skin may be formed from a sheet of material having the same composition as the material of the core, or alternatively the skin may be made from a material having different composition to that of the core to provide, for example, greater oxidation or corrosion resistance at the outer surface of the finished article.

I claim:

1. A method of applying a coating to a surface of a substantially rigid component, to form a composite article having a pre-determined shape, comprising the steps of:
    (a) forming a carrier member a part of which has a surface shaped in a pre-determined configuration;
    (b) applying a coating on said surface of the carrier member, the combination of the carrier member and coating being substantially rigid and the coating having a surface on the opposite side thereof from the carrier member which is shaped in reverse conformity to said surface of the rigid component;
    (c) assembling together the component and the carrier member, with the conforming surfaces of the component and the coating adjacent each other; and
    (d) hot isostatically pressing the assembled component and member with sufficient heat and pressure to form a diffusion bond between the adjacent conforming surfaces of the component and the coating, thereby to form a composite article.

2. A method of applying a coating as claimed in claim 1, including the further step of at least partly removing the carrier member from the composite article thus formed.

3. A method of applying a coating as claimed in claim 1, wherein said surface of the rigid component and said conforming surface of the coating are non-planar.

4. A method of applying a coating as claimed in claim 1, including the steps of applying at least two coatings to the carrier member in reverse order relative to their desired order on the article.

5. A method of applying a coating as claimed in claim 1, including the step of applying the coating to the carrier member in the form of spaced portions and hot isostatically pressing the member into said spaces, onto the article and thereafter removing those portions of the carrier member covering the coating.

6. A method of applying a coating as claimed in claim 1, including the step of applying a stop off material between the carrier member and the coating.

7. A method of applying a coating as claimed in claim 1, including the steps of forming grooves in said surface area of the coating and filling the grooves with a leachable material, prior to assembling together the component and the carrier member; and the step of leaching out the leachable material after hot isostatically pressing the component and member together, the leave passages in the article.

8. A method of applying a coating as claimed in claim 7, wherein the coating comprises a conglomerate of particles.

9. A method of applying a coating as claimed in claim 8 wherein the particles are metallic.

10. A method of applying a coating as claimed in claim 1, wherein the coating comprises a thermal barrier.

11. A method of applying a coating as claimed in claim 1, wherein the coating comprises an anti-wear skin.

12. A method of applying a coating to a surface of a substantially rigid component, to form a composite article having a pre-determined shape, comprising the steps of:
(a) forming at lest two carrier members, a part of each of which has a surface shaped in a respective pre-determined configuration;
(b) applying a coating on said surfaces of said carrier members, each combination of a carrier member and coating being substantially rigid, and the coating on each carrier member having a surface on the opposite side thereof from said carrier member when is shaped in reverse conformity to a portion of said surface of the rigid component;
(c) assembling together the component and the carrier members, with the conforming surfaces of the component and the coatings of said carrier members adjacent each other, said carrier members being so shaped as to completely surround said component;
(d) sealing said carrier members together and evacuating the interior of said thus sealed carrier members; and
(e) hot isostatically pressing the assembled component and carrier members with sufficient heat and pressure to form a diffusion bond between the adjacent conforming surfaces of the component and the coating, thereby to form a composite article.

13. A method of applying a coating as claimed in claim 12, wherein said carrier members are sealed together by welding.

* * * * *